United States Patent [19]

Woolf

[11] Patent Number: 4,541,411

[45] Date of Patent: Sep. 17, 1985

[54] GRAPHITE COMPOSITE COOKWARE

[75] Inventor: Lawrence D. Woolf, Carlsbad, Calif.

[73] Assignee: GA Technologies Inc., San Diego, Calif.

[21] Appl. No.: 629,356

[22] Filed: Jul. 10, 1984

[51] Int. Cl.$^4$ .............................................. A47J 27/00
[52] U.S. Cl. .................................. 126/390; 220/464;
220/456; 428/615
[58] Field of Search ................ 126/390; 220/455, 456, 220/464; 428/548, 615, 656

[56] References Cited

U.S. PATENT DOCUMENTS

| | | | |
|---|---|---|---|
| 1,555,484 | 9/1925 | Rosenberg | 126/390 |
| 2,057,254 | 10/1936 | Sommer | 220/455 |
| 2,526,687 | 10/1950 | Reams | 266/39 |
| 2,534,407 | 12/1950 | Bramberry | 126/390 |
| 2,841,137 | 7/1958 | Chace | 126/390 |
| 3,239,403 | 4/1966 | Williams et al. | 156/275 |
| 3,404,061 | 10/1968 | Shane et al. | 161/125 |
| 3,713,790 | 1/1973 | Takamori et al. | 29/195 |
| 3,788,513 | 1/1974 | Racz | 220/64 |
| 4,204,607 | 5/1980 | Zani | 126/390 X |
| 4,223,053 | 9/1980 | Brogan | 428/35 |
| 4,432,340 | 2/1984 | Conant et al. | 126/390 |

OTHER PUBLICATIONS

"Oriented Graphite for High Temperature Use in Erosive Atmospheres being Produced in Commercial Quantities by New Process", *Ind. Heating*, vol. No. 27, Mar. 1960, Issue No. 3, pp. 593-613.

*Primary Examiner*—Randall L. Green
*Attorney, Agent, or Firm*—Fitch, Even, Tabin & Flannery

[57] ABSTRACT

Multi-ply cookware having inner and outer plies of aluminum or stainless steel encasing an intermediate ply of a graphite material. The graphite material, which has thermally anisotropic properties, is oriented so that its thermal conductivity is higher in the plane parallel to the surface of the cookware than in the direction perpendicular to the surface. Accordingly, when the cookware is placed over a localized heat source, the intermediate graphite ply effectively conducts and distributes the heat provided by the burner throughout the plane parallel to the surface of the cookware before the heat propagates in the direction perpendicular to the surface of the cookware, thus minimizing hot spots on the inner surface.

4 Claims, 2 Drawing Figures

U.S. Patent  Sep. 17, 1985  4,541,411
FIG. 1
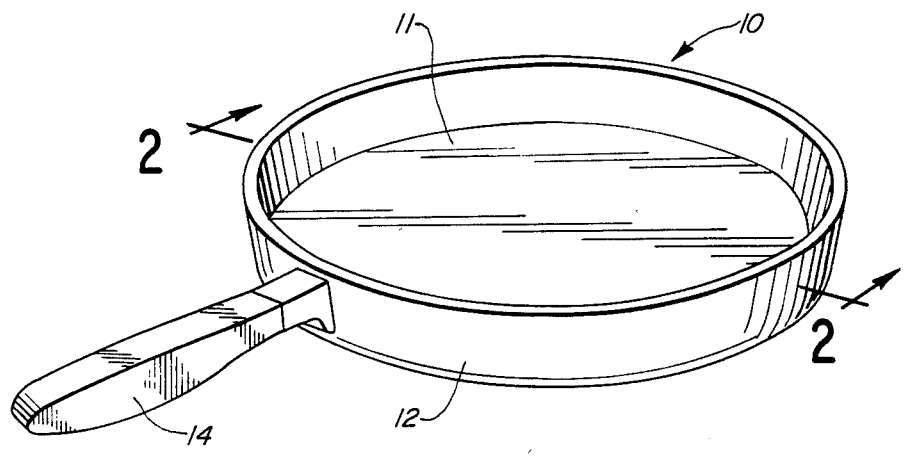
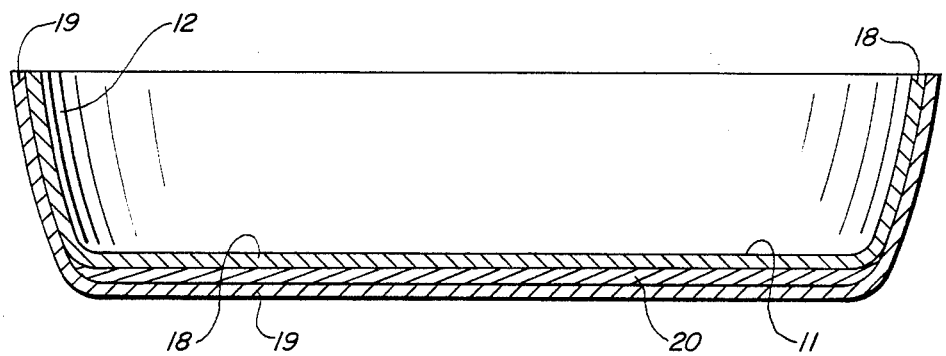
FIG. 2

GRAPHITE COMPOSITE COOKWARE

A continuing problem confronting cooks is obtaining, as nearly as possible, an efficient and uniform distribution of heat throughout the surface of their cookware so as to assure even cooking, baking, etc. The problem is particularly acute when cooking over highly localized heat sources, such as gas burners or electric heating elements. Consequently, when selecting materials for constructing cookware, those having relatively high rates of thermal conductivity have been utilized, such as aluminum and copper. In particular, copper-clad stainless steel cookware, with the stainless steel disposed on the interior of the cookware, has enjoyed wide acceptance due to the high heat conductivity of the copper and the corrosion resistance and easy cleanability of the stainless steel. Further, cookware made from these materials is light in weight and exhibits good structural strength. Also, in order to obtain a more even heat distribution, cookware has been constructed so that the thickness of the heat-conducting material decreases as the distance from the heat source increases, with the result that heat transfer is reduced through the thicker region.

While these types of utensils have provided both a more efficient heat transfer and a better heat distribution than their predecessors, their effectiveness is limited by the isotropic thermal conductivity of the materials from which the utensils are made, i.e., copper, aluminum, and stainless steel transmit heat equally well in all directions. Thus, hot spots in the cooking surface of the utensils adjacent to a heat source have been nearly unavoidable.

Accordingly, it is the primary object of the present invention to provide cookware that more efficiently and more evenly transmits heat through its surface, despite its being placed over a highly localized heat source. It is a further object to provide such cookware that is also light in weight and structurally strong.

Other objects and advantages will become apparent upon reference to the following description and accompanying drawings, in which:

FIG. 1 is a perspective view of a cooking utensil in which the present invention may be utilized; and FIG. 2 is a cross-sectional view taken substantially along the line 2—2 of FIG. 1.

Generally, the cookware of the invention comprises a multi-ply laminate of stainless steel or aluminum with an intermediate ply of an anistropic material, with the intermediate ply extending substantially across the entire surface of the cookware that rests on the burners or coils of a conventional gas or electric range.

Referring more specifically to the accompanying drawing, FIG. 1 shows a frying pan 10 having a substantially flat, circular bottom 11 adapted to rest on the burner or coil of a gas or electric range and, thus, constituting the heating region of the pan 10. The pan 10 includes an upstanding sidewall 12 extending upward from the bottom 11 so as to form a container for the food to be prepared therein. An insulated handle 14, affixed to the pan 10 by conventional means, is shown extending from the sidewall 12.

Referring to FIG. 2, the multi-ply construction of the pan 10 (not to scale) can be seen in greater detail. The bottom 11 is shown consisting of three plies: an inner ply 18, an outer ply 19, and an intermediate ply 20. The inner and outer plies 18, 19 are preferably made of aluminum or stainless steel, both of which are non-toxic, exhibit good wear resistance, and are resistant to oxidation. While aluminum is a better thermal conductor than stainless steel, (with aluminum having a thermal conductivity of approximately 2.35 W/K-cm, while stainless steel has a thermal conductivity of approximately 1.46 W/K-cm), the latter is generally easier to clean and has an attractive, bright finish that does not dull appreciably with age and use. As an option, the inner layer 18 can be provided with a non-stick coating (not shown), such as polytetrafluoroethylene or "Teflon", in which case the inner ply 18 is preferably made of aluminum as it provides for better bonding of the coating.

In keeping with the invention, the intermediate ply 20 is a thermally anisotropic material, i.e., the material exhibits different values of thermal conductivity when measured along different axes. The ply 20 is oriented so that the thermal conductivity in the plane parallel to the surface of the pan (The X—Y plane) is higher than that in the plane perpendicular to the pan's surface. As a result, the intermediate ply 20 effectively conducts and distributes the heat provided by the burner throughout the X—Y plane before the heat propagates in the direction perpendicular thereto to cause hot spots on the inner ply 18 of the pan.

Graphites, which may be characterized as laminated structures of carbon, possess anisotropic structures and, thus, possess many properties, including thermal conductivity, that are highly directional. Additionally, graphites are light weight and possess excellent structural strength. The graphite structure is generally considered to have two axes or directions: the a axis or direction being parallel to the carbon layers, and the c axis or direction being perpendicular to the carbon layers. Graphite has much higher thermal conductivity along its a axis then along its c axis. Consequently, in the present invention, an intermediate ply 20 of graphite is oriented so that its a axis is parallel to the X—Y plane of the pan, with the c axis perpendicular to the X—Y plane.

In the context of the present invention, the higher the anisotropy ratio (the ratio of thermal conductivity along the a axis to the thermal conductivity along the c axis) of the intermediate layer 20, the less pronounced the hot spots across the inner ply 18 of the pan 10. Pyrolytic graphite, which is highly oriented, has a thermal conductivity of approximately 0.1 W/K-cm along its c axis and has an anisotropy ratio of approximately 200. Consequently, pyrolytic graphite is a superior choice for the intermediate ply 20 of the inventive cookware. However, at present, pyrolytic graphite's prohibitive expense prevents its widespread use in cookware. Flexible graphite sheet, such as GRAFOIL(R) (made by Union Carbide Corporation pursuant to U.S. Pat. No. 3,404,061), or CALGRAPH (made by Calcarbon, Inc. of Chatsworth, Calif.), is commercially available at sizes and prices suitable for use in the present invention. These materials have thermal conductivities in the c direction of approximately 0.035 W/K-cm and 0.07 W/K-cm, respectively and have anisotropy ratios an order of magnitude less than of pyrolytic graphite, with GRAFOIL(R) having an anisotropy ratio of approximately 12, while the anisotropy ratio of CALGRAPH is approximately 31. Some graphite materials may be heat treated to provide a higher anisotropy ratio but again the heat treated graphite costs more.

Because of the relatively low thermal conductivity of graphites in the c direction, it is necessary for the intermediate graphite ply 20 to be sufficiently thin so as to not overly impede the conduction of heat from the heat source to the inner ply 18 of the pan 10. When GRA-FOIL(R) is employed as the intermediate ply 20, it is believed that satisfactory results can be obtained when the ply 20 is between 0.010 and 0.050 inches in thickness.

It may therefore be seen that the invention provides for cookware that has good thermal conductivity therethrough, while reducing the magnitude of hot spots on the cooking surface. Further, such cookware is lighter in weight and structurally superior to comparable cookware made entirely from stainless steel and/or copper. While the invention has been described in connection with its preferred embodiment, it will be understood that it is not intended to limit the invention to that embodiment. On the contrary, it is intended to cover all alternatives, modifications, and equivalents as may be included within the scope of the appended claims. For example, it should be appreciated that the invention could be employed in electric frying pans and the like, or that the cookware utilizing the invention could include a layer of porcelain or other ceramic material.

What is claimed is:

1. Multi-ply cookware having an inner surface for contacting the food to be cooked therein and an outer surface contacting the heat source comprising, in combination, an inner ply; an outer ply; and an intermediate ply in the heating region of the cookware of a thermally anisotropic graphite material, the intermediate ply being encased by the inner and outer plies and being oriented with its carbon layers being parallel to the surface of the cookware so that its thermal conductivity is higher in the plane parallel to the surface of the cookware than in the direction perpendicular to the surface.

2. The combination of claim 1 wherein the inner and outer plies are a metal selected from the group consisting of aluminum and stainless steel.

3. The combination of claim 1 wherein the graphite material has anisotropy ratio of at least 12 and is between 0.010 and 0.05 inches thick.

4. A cookware comprising: a body having inner heated surface for contacting the food; an outer bottom surface on the body for contacting a localized heat source and for transmitting heat in an isotropic manner; and a interior layer of thermally anisotropic graphite between the inner and outer surfaces oriented with its carbon layers being parallel to the surface of the cookware so that its thermal conductivity is higher in a plane parallel to the bottom heated surface than in the direction perpendicular thereto to distribute the heat more evenly to the inner heated surface, the graphite being between 0.010 and 0.05 inches thick and having an anisotropy ratio of at least 12.

* * * * *